United States Patent Office 2,703,747
Patented Mar. 8, 1955

2,703,747
METHOD OF MANUFACTURING NACREOUS LEAD PIGMENTS

Joseph E. Thornton, Chicago, Ill., assignor to The Sherwin-Williams Company, Cleveland, Ohio, a corporation of Ohio No Drawing. Application August 3, 1953, Serial No. 372,180

5 Claims. (Cl. 23—105)

This invention relates to a method of producing lead acid phosphate in a lamellar crystal form useful as a pigmentary material which, when employed in aqueous compositions, has a characteristic diffused sheen effect suggestive of mother-of-pearl.

A review of the prior art indicates a considerable volume of work having been done to simulate the nacreous luster obtained most effectively by the use of guanine As is well known, guanine is a very expensive product and is economically prohibitive to use as a pigmentary material for coating of large surfaces such as interior walls of a residence.

Mica has been found useful, but when used in quantities necessary to produce the desired luster in a dried coating, contributes objectionably to the porosity of the resultant film. For this reason mica is less desirable than other pigmentary products having a high index of refraction which contributes to the opacity of coating compositions including them. Other compounds which have been suggested for use in the production of lamellar crystals to simulate the effect of guanine in coatings include various compounds of mercury, arsenic, antimony, lead, bismuth, tin, manganese and zinc as well as certain powdered metals, e. g., aluminum, which can be produced in lamellar form which seems to be essential to the nacreous luster sought for in guanine substitutes.

Most of the above-indicated compounds are objectionable for one reason or another. Some are too toxic to be considered for use in aqueous paint systems, others have poor hiding qualities, still others are overly costly to manufacture or they are unstable in service or they must be used in such quantity as to be prohibitive in cost.

Hunsdiecker, U. S. 2,103,007, discloses a lamellar crystal form of lead acid phosphate having a nacreous luster suggestive of pearl. While Hunsdiecker indicates his product to have iridescence as do others in the prior art in describing a variety of guanine substitutes, iridescence has not been observed upon examination of many products claimed to possess this quality. Iridescence is a display of rainbow-like color from the surface due to resolution of light into individually observable color components due to interference and is a quality lacking in pigments referred to as nacreous and simulative of pearl. It is, therefore, to be observed that the terms "pearlescent" and "nacreous" are used to describe the brilliant lustrous effect generally obtained from certain foliaceous pigments characterized by a brilliant white luster suggestive of pearl but not essentially possessing the quality of iridescence.

The crystals formed of lead acid phosphate described by Hunsdiecker are of considerable interest. However, the process for obtaining the peculiar crystal form described involves formation of lead acid phosphate from a solution of phosphoric acid containing a large percentage of an organic additive such as alcohol, acetic acid, acetone, diacetone alcohol, isopropyl alcohol and glycol ethers by reacting the admixture with a solution of a lead salt. Investigation of the Hunsdiecker process indicated that recovery of the organic additives is not economically feasible and yet their use seemed to be essential in sought-for crystal form and size in the ranges essential to maximum nacreous effect in aqueous coating compositions.

It is the principal object of this invention to provide an improved method for the manufacture of lead hydrogen phosphate in a lamellar crystal form characterized by its nacreous luster and brilliance which eliminates the need for organic additives to control the crystal habit and size frequency of the resultant product.

It is a further object of this invention to provide an economical method for the production of lead acid phosphate in lamellar crystal form, controlled size frequency and nacreous luster and brilliance from simple aqueous salt solutions by accurate control of factors essential to the production of a pigmentary product useful to produce a pearlescent effect in aqueous coatings.

Broadly the process of this invention involves a double decomposition reaction of simple nature. Stock solutions are prepared by dissolving the salts in water. A first solution is made by dissolving a third of a mol of an alkali metal monoacid phosphate per liter of water. A second solution is prepared by dissolving about a half mol of lead nitrate per liter of water. The second solution is further adjusted as to its pH with nitric acid and is brought down from a normal pH of about 4.2 to between a pH of 1 and 3, but preferably to a pH of 1.5. The nature of the acid used to adjust the pH is found to be critical in obtaining the desired size frequency of crystals, maximum brilliance and high yield. Nitric acid seems to be specific to the purpose. Acetic acid, for example, produces too high a percentage of fine particles with a narrow width of crystal which detracts from the nacreous optical effect sought for. Both solutions are heated to a range which include broadly a temperature of from 50 degrees to the boiling points of the respective solutions and preferably a range from 70 degrees to 90 degrees C.

To a stoichiometric excess of hot alkali metal monoacid phosphate is added the acidified lead nitrate solution. The time of addition does not appear to be critical but it is preferred to make the addition over a short period of time rather than by merely dumping lead nitrate solution into the phosphate solution. It has been found satisfactory to use a stoichiometric excess of about 4% by weight of the alkali metal monoacid phosphate although greater excesses can be used. If too great a surplus of phosphate is employed, the final pH of the reaction mass is too high. It has been observed that the product is of inferior quality if an attempt is made to recover the product at a pH above 3. This for the reason that the product appears to become contaminated with lead phosphate which interferes with the brilliance of the recovered crystals.

It is not intended to imply that the crystals obtained by the present process are iso-disperse or that they have the same crystal size throughout, but it has been observed that control of the process conditions within the limits described herein yields a product having a maximum number of crystals in a desired size frequency range. While some crystals are smaller and some are larger, a number of microscopic observations have shown the bulk of the crystals recovered lie within the range of 25 to 60 microns wide and 30 to 120 microns long.

The nature of the salts used seems to be specific. Diammonium acid phosphate, for example, yields a product which is acceptable, but not preferred, for there is a tendency for the crystals to be too narrow in breadth. Monosodium diacid phosphate produces impractically low yields. Trisodium phosphate is not useful and the presence of polyphosphates, even in very small amounts, interferes with the luster of the ultimate product. In one instance, commercially available monosodium diacid phosphate was tested which was found to contain polyphosphate. Lamellar crystals were not obtained as far as visual observation could determine and a very high percentage of fine crystals resulted. However, in the second run, C. P. monosodium salt was employed and although the losses were excessive, the crystal structure was more nearly acceptable for the purposes described. Substitution of lead acetate for lead nitrate proved unsatisfactory again for the reason that too large a percentage of fine crystals were obtained in the crystallized product. Equivalent phosphates include the alkali metal and ammonium monoacid phosphates, but the preferred phosphates include only the alkali metal mono acid phosphates.

Having described the invention generally, the following examples further illustrate the process and its limitations.

Example 1

Two stock solutions were prepared as follows:

A first aqueous solution was made by dissolving 165.6 grams of lead nitrate per liter of water. The pH of the solution was adjusted to 1.5 from its original 4.2 value by adding 2.5 cc. per liter of 70% nitric acid. The acidified solution was heated to 85 degrees C. for use.

A second aqueous solution was prepared by dissolving 78.3 grams of disodium monoacid phosphate per liter of water and this solution, too, was heated to 85 degrees C. for use.

To 520 ccs. of the second solution in a jacketed vessel was added 500 ccs. of the acidified lead nitrate solution, while maintaining the temperature within a 70 to 90 degrees C. range.

Addition took place over a twenty minute interval. The pH of the final reaction mass was 2.5. The crystals and the mother liquor were held at 85 degrees for an additional 15 minutes, and the crystals filtered off. They were first washed with water acidulated with nitric acid and subsequently with water until free of nitric acid ions. The recovered crystals were of brilliant nacreous luster and of a lamellar crystal form. The majority of the crystals were within the range of from 25 to 60 microns wide and 30 to 120 microns long and an estimated 0.5 to 2.0 microns in thickness. Maximum luster was found to be dependent, in part, upon the breadth of the crystal and in general the broader the crystal the greater the luster. Fines are detrimental to brilliance, and the nearer the size frequency approaches a maximum at the above dimension, the more desirable the crystals for pigmentary use.

This example details the optimum process conditions from which process practically no fine particles were obtained. In the subsequent examples, all salt substitutions were made on an equivalent molar basis.

Comparison of the quality of crystals obtained were made by their inclusion in a latex emulsion paint base for comparative results.

*Example 2*

The above example was repeated but lead acetate was substituted for lead nitrate and acetic acid was used as an acidifying agent.

The product obtained contained too large a percentage of fines or small crystals not suitable as pigments to produce the pearlescent effect necessary for decorative coatings.

*Example 3*

Example 1 was repeated, but diammonium acid phosphate was substituted for disodium acid phosphte. The crystals obtained were narrow in dimension and while useful were inferior.

*Example 4*

Example 1 was repeated, but monosodium diacid phosphate was substituted. The yield obtained did not compare favorably with that of Example 1; the losses (e. g. 15–20%) were excessive. The pH of the mother liquor was found to be below 2.2, and upon adding alkali to bring back up to pH 3 the crystals obtained were unsatisfactory, e. g., having an excessive percentage of fines.

*Example 5*

Same as Example 1, but trisodium phosphate was substituted for disodium acid phosphate. Polyphosphates were found to give fine crystal development and as far as determined, were not of the platelet structure essential to nacreous luster.

*Example 6*

Same as Example 1, but monosodium diacid phosphate of commerce was substituted. Platelets were not obtained. A repeat using the C. P. monosodium salt gave the desired crystal structure but not as uniformly as obtained with the disodium salt. Results from runs similar to this one are the basis for the belief that polyphosphates interfere with formation of the desired crystal growth.

*Example 7*

Same as example 1, but phosphoric acid was substituted for disodium acid phosphate. Poor results, as in Example 6, were obtained. Crystals were unsuited for use as nacreous pigmentary lead phosphate. A large percentage of primary $Pb(HPO_4)_2$ was obtained.

*Example 8*

Same as Example 1, but the disodium acid phosphate solution was added to the hot lead nitrate solution. The crystals obtained were of smaller dimensions and the luster was of observably lower magnitude.

*Example 9*

A series of runs were made, identical with Example 1, except the temperature of the solutions was varied by 10 degrees C. intervals from 30 degrees C. to the boiling point of the solutions employed. At 30 degrees C. the crystals were too small, e. g., from 15–20 microns wide and about 35 microns long and at boiling the size averaged about 100 microns by 250 microns, which is larger than desired. Between 70 degrees C. and 90 degrees C. the particles ranged from an average of 25 to 60 microns wide by 30 to 120 microns long which range appears to give optimum nacreous luster. It was also observed that there was a successive decrease in the percentage of fine crystals and an increase in luster up to a temperature of about 70 degrees C.

While broadly a temperature range of from 50 degrees C. to the boiling point gave a usable product, optimum results and preferred products were obtained in the range of from about 70 degrees to about 90 degrees C.

*Example 10*

An additional series of tests were run, similar to Example 1 but the amount of nitric acid added to the aqueous lead nitrate solution, normally of pH 4.2, was varied from none to sufficient so that the final pH of the mother liquor was below 1.5. Optimum recovery of product was obtained when sufficient acid was included in the lead nitrate solution to bring the pH down to 1.2 which gave a product mother liquor of pH between 2.2 and 3.0.

Above a final pH of 3.0 appreciable quantities of $Pb_3(PO_4)_2$ contaminate the product crystals and interfere with the luster effect sought in the pigment. Below pH 2.0 product losses increased. Acids other than nitric were employed. Sulfuric acid gave a product having a different crystal habit. Acetic acid adversely affected the width of crystals formed under its influence. From results obtained, it appears that nitric acid is specific and favors formation of the sought for crystal habit.

*Example 11*

A series of test runs were made employing the quantities and concentrations of ingredients as in Example 1. The variation made was in the rate of addition of the lead nitrate solution to the disodium acid phosphate solution. Time of addition varied from one minute to twelve minutes with no noticeable difference in the quality of the crystalline pigmentary product obtained.

*Example 12*

Same as Example 1, but dipotassium monoacid phosphate was substituted for the sodium equivalent. No appreciable differences were observed over the product of Example 1.

*Example 13*

A further series of test runs or manufactures was made employing the process of Example 1, but the molar concentrations of the aqueous salt solutions was varied as well as the ratios of the reactants to one another. The concentration of the water-soluble monoacid phosphate was varied from 30 grams to 130 grams per liter without difficulty of a practical nature. Lead nitrate solutions were varied from 75 to 275 grams per liter and pH from 1 to 3 without departing from the desired crystal habit or size frequency of crystal essential to the ends of the invention.

A practical stoichiometric excess of disodium monoacid phosphate over lead nitrate was found to be about 4% by weight for maximum recovery, control of final pH and maximum brilliance of crystals recovered.

Having thus described and illustrated the best mode of practicing the improved process to which this invention relates, I claim:

1. A process for producing lead hydrogen phosphate in lamellar crystal form characterized by its nacreous luster and brilliance which comprises treating a hot dilute aqueous solution of an alkali metal monoacid phosphate salt at a temperature of from 60 to 100 degrees C. with less than a stoichiometric equivalent of a dilute aqueous solution of lead nitrate acidified to a pH of from 1 to 3 with nitric acid and recovering the precipitated crystals.

2. A process for producing lead hydrogen phosphate in lamellar crystal form characterized by its nacreous luster and brilliance which comprises treating an aqueous solution containing from 30 to 130 grams per liter of an alkali metal monoacid phosphate at a temperature of from 60 to 100 degrees C. with less than a stoichiometric equivalent of an equally hot aqueous solution containing from 75 to 275 grams/liter of lead nitrate acidified to a pH of from 1 to 3 with nitric acid and recovering the precipitated crystals.

3. Same as in claim 2, but where the alkali metal monoacid phosphate is disodium monohydrogen phosphate.

4. A process for producing lead hydrogen phosphate in lamellar crystal form characterized by its nacreous luster and brilliance which comprises treating an aqueous solution containing from 30 to 130 grams per liter of an alkali metal monoacid phosphate at a temperature of from 75 to 90 degrees C. with less than a stoichiometric equivalent of an equally hot aqueous solution containing from 75 to 275 grams per liter of lead nitrate acidified to a pH of from 1 to 3 with nitric acid and recovering the precipitated crystals.

5. A process for producing lead hydrogen phosphate in lamellar crystal form characterized by its nacreous luster and brilliance which comprises treating an aqueous solution of about 0.3 molal concentration of disodium monoacid phosphate at a temperature of from 75 to 90 degrees C. with less than a stoichiometric equivalent of an equally hot aqueous solution of about 0.5 molal concentration of lead nitrate acidified to a pH of about 1.5 with nitric acid and recovering the precipitated crystals.

No references cited.